(12) United States Patent
Robertson et al.

(10) Patent No.: US 8,347,295 B1
(45) Date of Patent: Jan. 1, 2013

(54) PROFILE-BASED ASSIGNMENT OF QUEUED TASKS

(75) Inventors: Don Robertson, Pleasanton, CA (US); Kenwood Tsai, Palo Alto, CA (US); Gladys Pang, Union City, CA (US)

(73) Assignee: EMC Corporation, Hopkinton, MA (US)

( * ) Notice: Subject to any disclaimer, the term of this patent is extended or adjusted under 35 U.S.C. 154(b) by 1324 days.

(21) Appl. No.: 11/388,856

(22) Filed: Mar. 23, 2006

(51) Int. Cl.
*G06F 9/46* (2006.01)

(52) U.S. Cl. ....................................................... 718/103

(58) Field of Classification Search .................. 718/102, 718/103
See application file for complete search history.

(56) References Cited

U.S. PATENT DOCUMENTS

| | | | |
|---|---|---|---|
| 4,356,546 A * | 10/1982 | Whiteside et al. .............. 714/10 |
| 5,463,624 A | 10/1995 | Hogg et al. |
| 5,745,778 A | 4/1998 | Alfieri |
| 5,881,284 A * | 3/1999 | Kubo ............................ 718/100 |
| 5,974,392 A * | 10/1999 | Endo ................................. 705/8 |
| 6,665,699 B1 | 12/2003 | Hunter et al. |
| 6,714,960 B1 | 3/2004 | Bitar et al. |
| 6,819,652 B1 | 11/2004 | Akhtar et al. |
| 6,928,647 B2 | 8/2005 | Sager |
| 6,988,139 B1 * | 1/2006 | Jervis et al. .................... 709/226 |
| 6,993,765 B2 | 1/2006 | Suzuki et al. |
| 7,039,176 B2 | 5/2006 | Borodow et al. |
| 7,080,379 B2 | 7/2006 | Brenner et al. |
| 7,155,400 B1 * | 12/2006 | Jilk et al. ...................... 705/7.14 |
| 7,681,196 B2 | 3/2010 | Vedula |
| 2002/0181440 A1 | 12/2002 | Norman et al. |
| 2003/0004950 A1 | 1/2003 | Wils et al. |
| 2003/0043832 A1 | 3/2003 | Anisimov et al. |
| 2003/0152212 A1 * | 8/2003 | Burok et al. ............. 379/265.02 |
| 2004/0019891 A1 | 1/2004 | Koenen |
| 2005/0149949 A1 * | 7/2005 | Tipton et al. ................... 719/321 |
| 2006/0037021 A1 | 2/2006 | Anand et al. |
| 2006/0155705 A1 | 7/2006 | Kamper et al. |
| 2007/0283355 A1 * | 12/2007 | Misono et al. ................. 718/102 |
| 2009/0113440 A1 * | 4/2009 | Dorny ............................ 718/104 |

* cited by examiner

*Primary Examiner* — Meng An
*Assistant Examiner* — Blake Kumabe
(74) *Attorney, Agent, or Firm* — Van Pelt, Yi & James LLP

(57) ABSTRACT

Assigning queued tasks is disclosed. A request is received for a task assignment. A task is automatically assigned from a queue to a task performer based at least in part on a profile of the task performer.

22 Claims, 11 Drawing Sheets

PROFILE-BASED ASSIGNMENT OF QUEUED TASKS

BACKGROUND OF THE INVENTION

Work tasks can be placed in one or more queues for task performers to take out of the queues and process. Depending on the need, different numbers of task performers can be assigned to process tasks in a given queue. One simple scheme to determine which tasks are removed from a queue by a task performer is "first in/first out" where the first task into the queue is processed before the second task is processed. However, this simple scheme is not flexible and it is difficult to guarantee a level performance. In particular, some tasks may require that specific skills are required to process the tasks. Also, different queues for different purposes require different behaviors. It would be useful if a queue could be flexible to the differing behaviors required by different queues, queue purposes, and tasks. In particular, it would be useful if tasks could be appropriately assigned to task performers.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Profile based assignment of queued tasks is disclosed. A request is received for a task assignment. A task is automatically assigned from a queue to a task performer based on a profile of the task performer. For example, a task performer is assigned the highest priority task that he/she is allowed to work on from all of the queues that he/she has been assigned to work on. In various embodiments, the profile includes experience level, skill level, qualification to handle value level, qualification to handle a geographic area, qualification to handle customer type, qualification to handle a type of time priority, qualified to handle tasks requiring special knowledge, or any other appropriate qualification or skill set.

Figure 1:
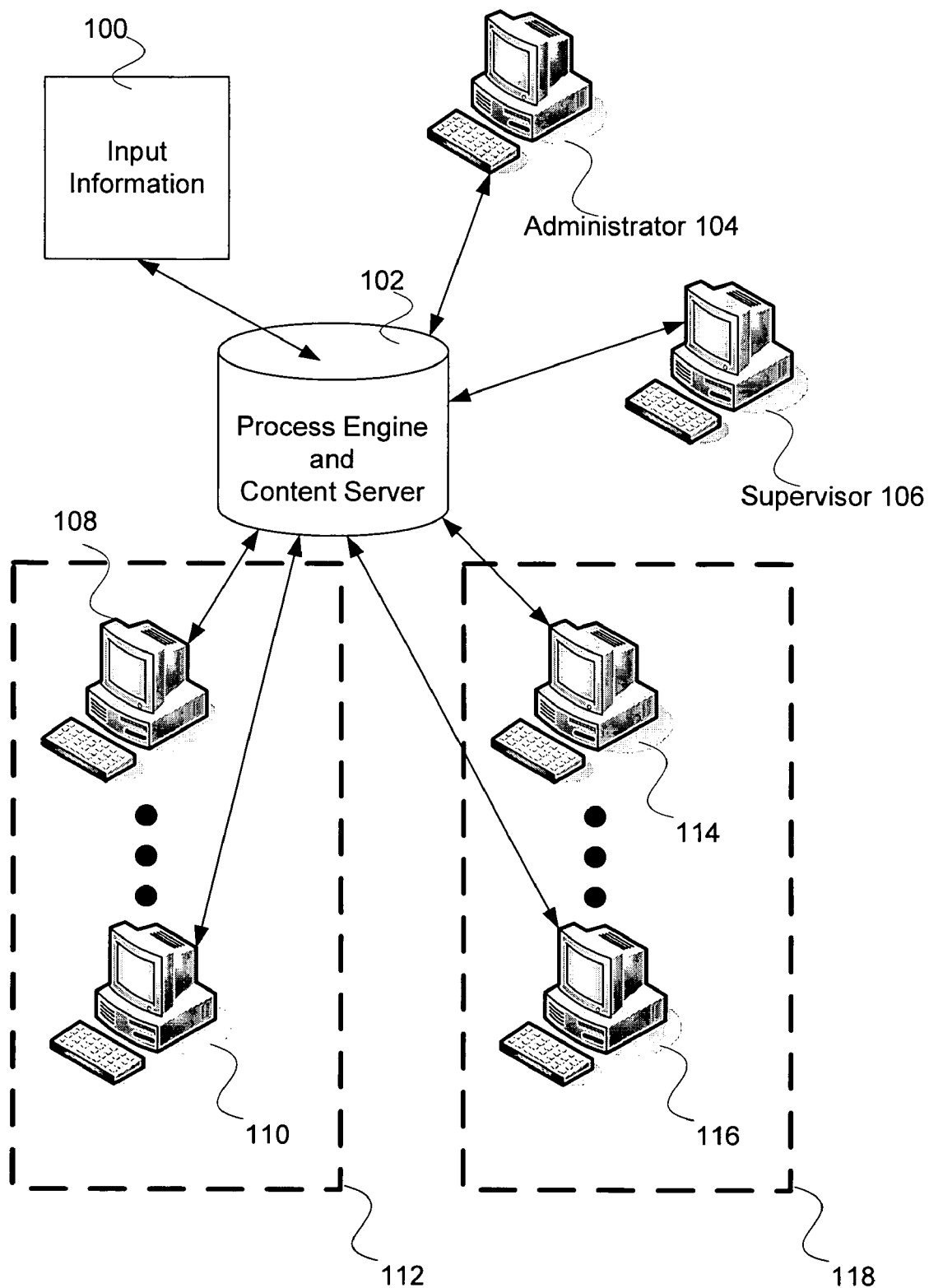
FIG. 1 is a block diagram illustrating on embodiment of a system for configuring prioritization and aging of queued tasks.

FIG. 1 is a block diagram illustrating on embodiment of a system for configuring prioritization and aging of queued tasks. In the example shown, input information 100 is input to process engine and content server 102. Process engine and content server 102 is administered by an administrator represented in FIG. 1 as using computer system 104 to interact with process engine and content server 102. The role of the system administrator in various embodiments includes creating queues, creating profiles for task performers, creating rules for queues, creating rules for aging of tasks within queues, etc. Input information includes, but is not limited to, images, faxes, electronic forms, enterprise reports, and/or enterprise data. In some embodiments, input information enters a work flow that creates tasks associated with input information. In some embodiments, input information is content managed by a content management system. Tasks are processed by task performers, which are represented in FIG. 1 as using computer systems 108, 110, 114, and 116. Task performers can pull tasks from queues. In various embodiments, task performers also can return the task to the queue, reassign the task to another task performer, suspend the task and resume processing later, and finish processing, which sends the task to the next step in the work flow. In some embodiments, task performers are also part of groups, which is represented in FIG. 1 as group 112 that includes computer systems 108 and 110 and group 118 that includes computer systems 114 and 116. Tasks and task performers are supervised by supervisor 106, which is represented in FIG. 1 as using computer system 106. The role of the supervisor in various embodiments includes monitoring queues, viewing task progress, assigning tasks, reporting status, adding a task performer to and removing a task performer from a queue, etc. Computer systems 104, 106, 108, 110, 114, and 116 all interface with process engine and content server 102. In various embodiments, the interface between the computer systems and the process engine and content server 102 includes one or more of a local area network, a wide area network, the internet, a wired network, a wireless network, and any other manner of interfacing a computer system and a process engine/server. In various embodiments, process engine and content server 102, computer systems 104, 106, 108, 110, 114, and 116 are implemented in one physical unit, are each implemented in one physical unit, are each implemented in more than one physical unit, or a mix thereof. In some embodiments, the tasks are assigned to queues, and the queues are configured such that the tasks have an assigned priority and an assigned 'aging', or changing, of priority as a function of time or an aging period/interval, in the queue. In various embodiments, the queues enable balancing workloads among task performers, managing large volumes of tasks, responding appropriately to high value requests, achieving service levels and compliance, and monitoring work progress.

Figure 2:
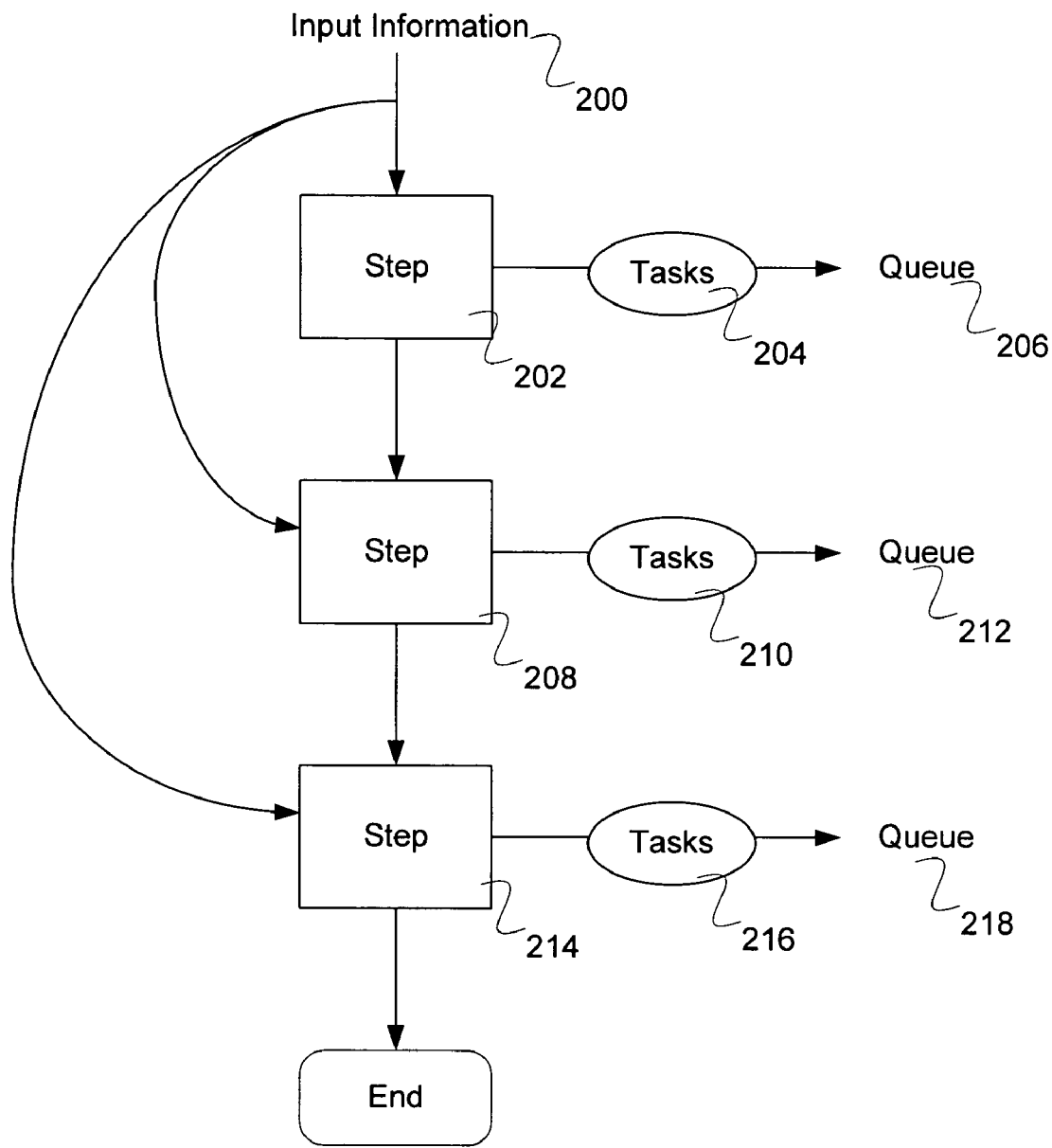
FIG. 2 is a flow diagram illustrating an embodiment of a work flow process in a system for configuring prioritization and aging of queued tasks.

FIG. 2 is a flow diagram illustrating an embodiment of a work flow process in a system for configuring prioritization and aging of queued tasks. In some embodiments, the work flow process of FIG. 2 is executed as part of a content management system. In the example shown, input information 200 is processed in a series of steps represented in FIG. 2 as steps 202, 208, and 214. In some embodiments, steps 202, 208, and 214 are parts of a work flow process that takes place in a computational device such as process engine and content server 102. In step 202, input information 200 is processed and creates one or more tasks 204 which are placed in queue 206. In some embodiments, tasks are associated with a content management system. In various embodiments, tasks are steps in a business process for processing a mortgage or other credit application (e.g. application, appraisal, title search, approval, etc.), insurance claim processing (e.g. claim filing, evaluation, appraisal, settlement, etc.), or any other appropriate business process involving a work flow comprising one or more tasks, e.g., one or more tasks requiring access to and/or otherwise involving one or more items of managed content. In the example shown, step 208 takes input from step 202, directly from input information 200, and/or from the output of the processing performed by task performers processing tasks 204 in queue 206 (not shown). Step 208 processes its input and creates one or more tasks 210 which are placed in queue 212. Similarly, step 214 takes input from step 208, directly from input information 200, and/or from the output of the processing performed by task performers processing tasks 210 in queue 212 (not shown). Step 214 processes its input and creates one or more tasks 216 which are placed in queue 218 and the process ends. In some embodiments, tasks 204, 210, and 216 are prioritized in queues 206, 212, and 218 in a configurable manner; specifically, an initial priority, an aging incremental priority, and an aging incremental time period are configured for each queue. In some embodiments, an initial priority is assigned to a task based at least in part on a rule, applied for example by logic associated with the queue, as opposed to being assigned and determined solely by a business process (e.g., step 202, 208, or 214) that generated the task. In some embodiments, the rule may use as an input one or more data values, parameters, and/or metadata associated with the task. In some embodiments, the aging priority as a function of time is more complex than an increment for each passing of a fixed time period such as a polynomial or other non-linear function of time or any other suitable aging priority function.

In some embodiments, a step in the work flow process is a configurable step that monitors the quality of the previous step. In some embodiments, the configuration enables examining a fraction of the output based on a random sampling, a fractional sampling (for example, every tenth output), a criteria (for example, an insurance claim for an amount greater than a certain amount), or any other appropriate basis. In some embodiments, the monitoring step provides feedback information to the task performer that processed input information to produce the output that is being monitored. In various embodiments, the feedback is provided directly to a supervisor (for example, supervisor 106 of FIG. 1), directly to the task performer, or logged for later review or reporting. In various embodiments, the monitoring step comprises a configurable quality assurance or rework step.

Figure 3:
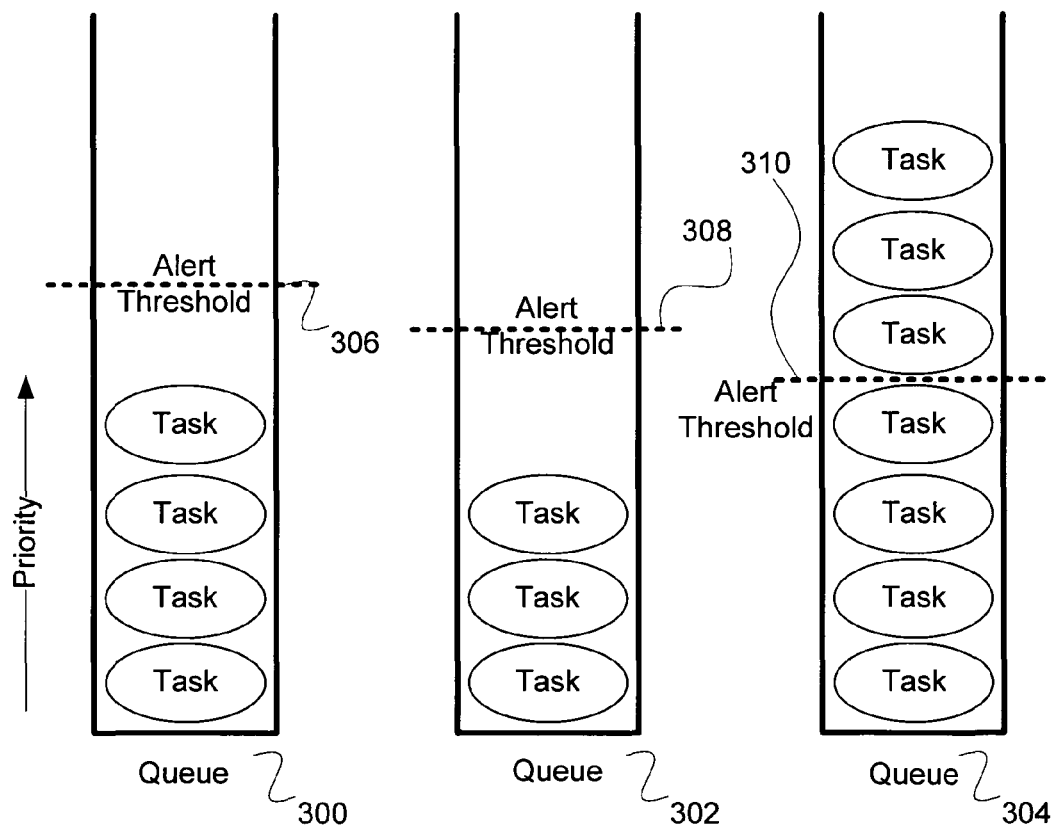
FIG. 3 is a block diagram illustrating an embodiment of task queues.

FIG. 3 is a block diagram illustrating an embodiment of task queues. In the example shown, queues 300, 302, and 304 contain multiple tasks. Each queue has a maximum expected number of tasks, represented in FIG. 3 by an alert threshold for queue depth 306, 308, and 310 for queues 300, 302, and 304 respectively. In some embodiments, the respective alert thresholds for queue depth are configurable and can be set, e.g., by an administrator, for a particular queue at a level determined by the administrator to be appropriate under the particular circumstances, e.g., the nature and importance of the tasks the queue will be used to manage, quality of service and/or other performance commitments made with respect to tasks to be managed via the queue, etc. In the example shown, the number of tasks in queues 300 and 302 is lower than the respective alert threshold for queue depths 306 and 308 for those queues. However, for queue 304 the number of tasks in the queue have exceeded the alert threshold for queue depth 310. In this case, an alert would be issued that the alert threshold for queue depth has been exceeded. In various embodiments, the alert comprises one or more of the following: an email message, a notification on a graphical user interface, a text message, an audible warning, a recorded spoken warning, and any other appropriate alert method for issuing an alert. In various embodiments, one or more queue supervisors are informed of exceeding the alert threshold for queue depth, one or more task performers are informed of exceeding the alert threshold for queue depth, a system administrator is informed of exceeding the threshold, and/or any other appropriate person or entity. In some embodiments, sending an alert enables the recipient to respond accordingly, e.g., to allocate more task performers and/or other resources to performing tasks in a queue that has exceeded its alert threshold level.

In the examples shown in FIG. 3, the tasks in each queue are sorted in order of arrival date, but have been displayed here in order of increasing priority, with higher priority tasks appearing at a position higher in the queue (as shown in FIG. 3) than tasks with lower priority. In some embodiments, the highest priority task is on top and will be pulled from the queue next in an embodiment in which tasks are pulled in priority and/or queue position order. In some embodiments, factors other than priority are taken into consideration, such as the skill set or qualification level of a particular task performer, quality of service commitments made to a particular customer, etc., and in some such embodiments the highest priority (i.e., highest queue position) task that meets such other criteria is pulled. In some embodiments, the manner in which the priority for a task in a queue, such as queues 300, 302, and 304, is determined and/or modified over time is configurable. In some embodiments, configuration includes an initial priority, an increment value, and an increment interval so that a task initially starts in a queue with the initial priority and this initial priority is incremented every increment interval by the increment value. In various embodiments, a priority configuration is applied to multiple queues and/or different priority configurations are applied to different queues. In some embodiments, an individual task can override the priority configuration for the queue, for example by specifying an initial priority, aging increment, and/or aging interval or period that is different than that associated with the queue and/or that would otherwise have been determined by application to the task of a rule and/or logic associated with the queue. In some embodiments, initial priority is determined by a priority assignment rule associated with the queue, but it can also be determined by an overriding initial priority policy that is based on the document profile of the associated content of the task entering the queue. For example, if one of the document profiles indicates that the customer is of a certain class, the initial priority may be higher than the default priority assignment for that queue. In some embodiments, a priority configuration is set based on rules. In some embodiments, the same initial priority is assigned to each task added to a queue. In some embodiments, the initial priority assigned to a particular task is determined at least in part by a rule associated with the queue. In some embodiments, the rule is applied at least in part to and/or uses as in input a data value, parameter, metadata, and/or other value associated with the task. In some embodiments, the rule is implemented at least in part by logic associated with the queue. For example, in an insurance claim processing work flow a task associated with a claim for a high amount is given a higher priority upon being added to a queue as compared to a claim for a less high, or low, amount which is given a lower priority.

In some embodiments, each of queues 300, 302, and 304 has associated with it a alert threshold for queue priority (not shown in FIG. 3) for the priority of tasks in the queue. The priority of each task in the queue is aged such that for any given task the priority increases the longer the task remains in the queue. If the priority of the task having the highest priority in the queue exceeds the corresponding alert threshold for queue priority for that queue, an alert (such as the one described above in connection with exceeding the alert threshold for queue depth) is sent. In some embodiments, the alert threshold for queue priority is configurable.

Figure 4:
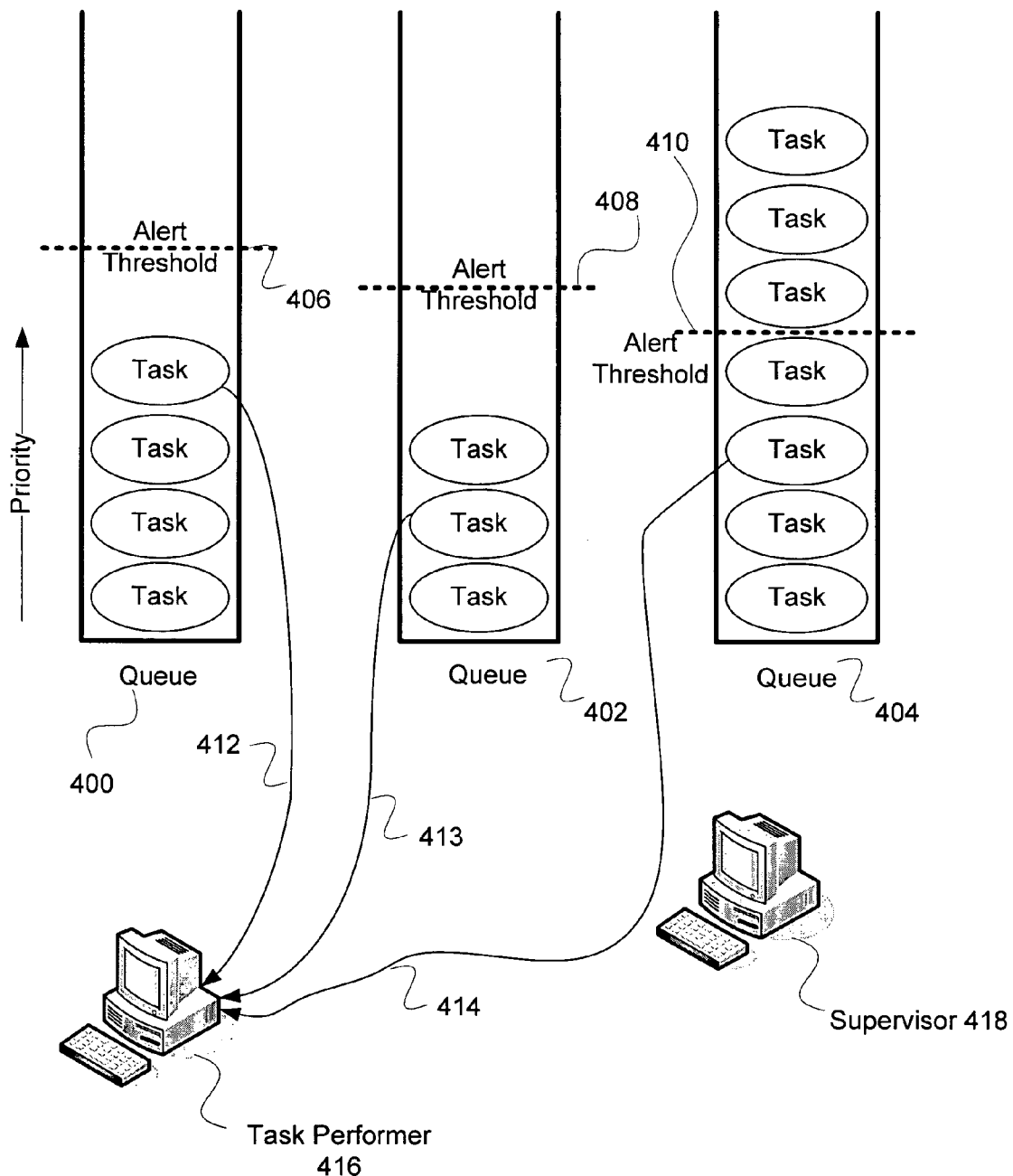
FIG. 4 is a block diagram illustrating an embodiment of a process for removing tasks from a queue.

FIG. 4 is a block diagram illustrating an embodiment of a process for removing tasks from a queue. In the example shown, queues 400, 402, and 404 with alert thresholds for queue depth 406, 408, and 410 respectively each contain a plurality of tasks. A task performer, represented as using computer system 416 in FIG. 4, can pull a task off of a queue. The highest priority task can be pulled off of a queue, as represented by 412 in FIG. 4 where the highest priority task in queue 400 is pulled off by task performer 416. In some embodiments, the highest priority task that the task performer is allowed to or is able to perform is pulled off the queue, even if a higher priority task that the performer is not able to perform is present in the queue, as represented by 413 in FIG. 4 where the second highest task in queue 402 is a task that task performer 416 is allowed to or is able to perform. In various embodiments, the task performer is allowed to or is able to perform the processing of a task based at least in part on one or more of the following, expertise or skill level, seniority, regional knowledge, training level, customer type, geographic knowledge, supervisory, or any other appropriate criteria. A task can also be assigned to a task performer by a supervisor, as represented by 414 where a task in queue 404 is assigned to task performer 416 by supervisor 418.

Figure 5:
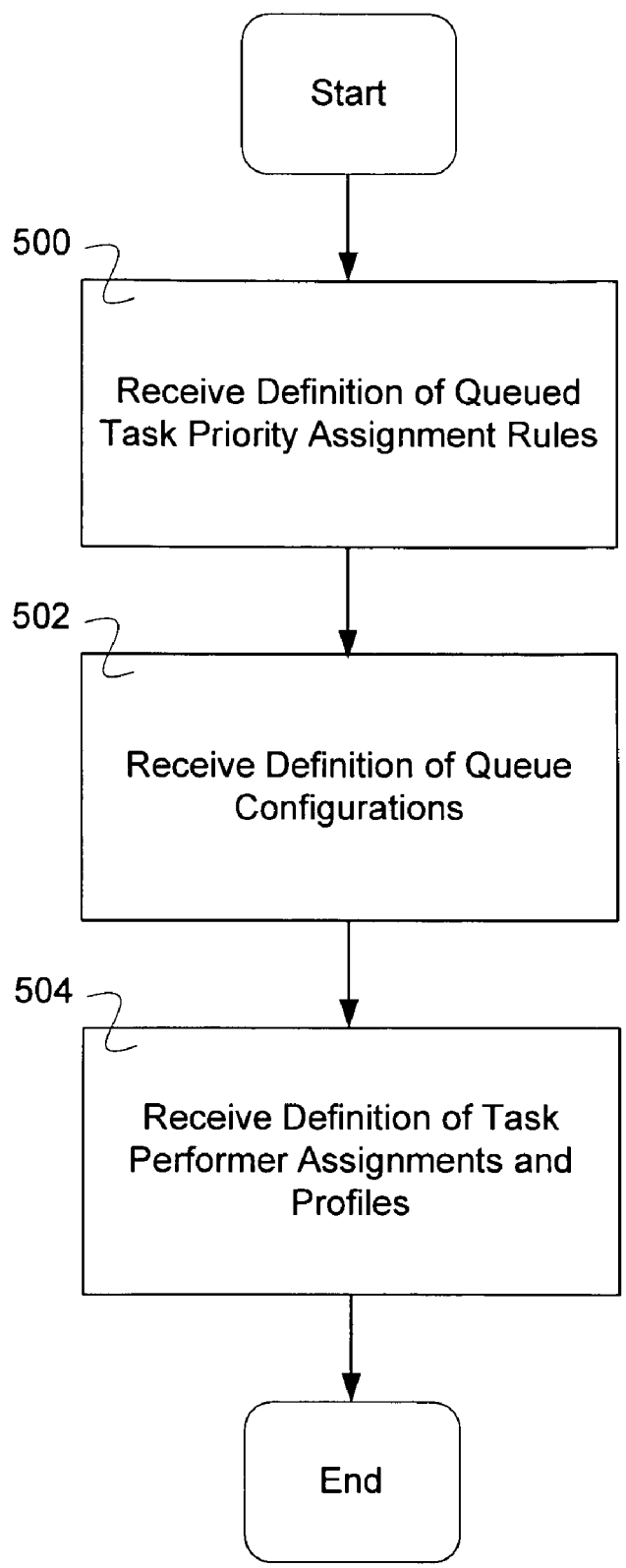
FIG. 5 is a flow diagram illustrating an embodiment of a process for configuring prioritization and aging of queued tasks.

FIG. 5 is a flow diagram illustrating an embodiment of a process for configuring prioritization and aging of queued tasks. In the example shown, in 500 a definition is received for queued task priority assignment rules. In some embodiments, the priority assignment rules include a predetermined initial priority setting, a priority aging increment value, and a priority aging interval. When a task is queued the initial priority is set to a predetermined initial priority. After a priority aging interval time period the priority of the task is incremented by the aging increment. The task will therefore rise in priority as it sits in the queue. In various embodiments, the priority assignment rules defined at 500 set the initial priority, whether the task is to be aged, the aging increment, and the aging interval based at least in part on a data value associated with the task, such as a task property or attribute—for example, the customer associated with the task, the dollar amount associated with the task, the geographic region that the task is associated with, the type of request associated with the task, or any other relevant task property. In 502, a definition is received for queue configurations. The queue configurations include an alert threshold for queue depth for number of tasks in the queue, an alert threshold for queue priority for priority of a task in the queue, and alert/notification information as to who is informed and how when the thresholds are exceeded. In 504, a definition is received for task performer assignments and profiles. When assigned to a queue, a task performer can be assigned a task from that queue when the task performer requests a task. A task performer's profile includes information regarding the skill level (for example, advanced, trainee, intermediate, etc.), the experience level (for example, novice, junior, senior), and/or special expertise areas (for example, regional expertise, high dollar amount tasks, flood related tasks, electrical related tasks, etc.). In various embodiments, the process steps of FIG. 5 can be done in any order, simultaneously, or any combination of ordered and simultaneously executed steps.

Figure 6:
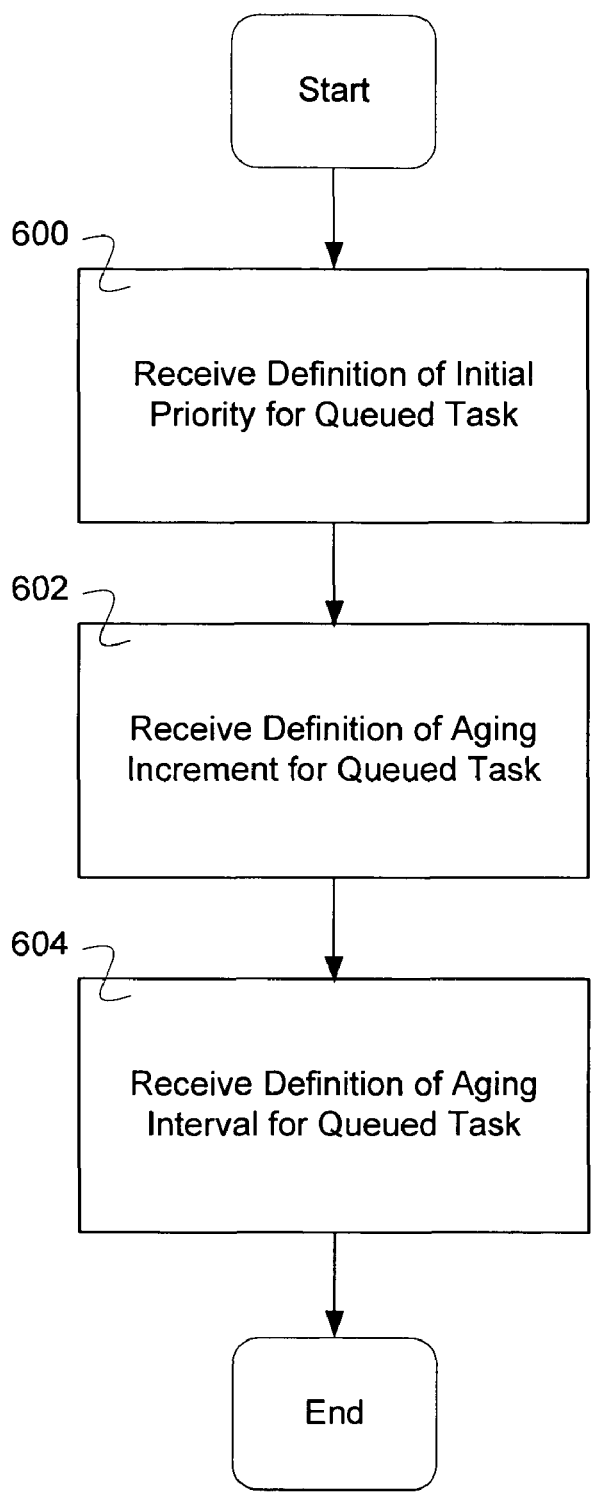
FIG. 6 is a flow diagram illustrating an embodiment of a process for receiving a definition of queued task priority assignment rules.

FIG. 6 is a flow diagram illustrating an embodiment of a process for receiving a definition of queued task priority assignment rules. In some embodiments, the process in FIG. 6 is used to implement 500 in FIG. 5. In the example shown, in 600 a definition is received of the initial priority for a queued task. For example, a value of 20 is set for the predetermined initial value. In some embodiments, 600 includes receiving a definition of a rule or logic that assigns to at least certain tasks an initial value that is based at least in part on a property or data value of an attribute of the task that is to be queued—for example, a task for a highly valued customer may receive higher priority, a task with a higher dollar amount may receive a higher priority, or a task associated with a region or a natural disaster might receive a higher initial priority. In some embodiments, the initial value is configured based on which queue the task is in (in the event that cross queue comparisons are made)—for example, the approval queue has higher initial priority than the complaints queue. In some embodiments, the predetermined initial priority is overridden if certain data is included in and/or associated with an individual task, such as data specifying a priority different than what the queue is configured to assign, or if a supervisor specifies and/or adjusts the priority. In the example shown, a queued task is aged. In some embodiments, a queued task is not aged. In 602, a definition is received of the aging increment for a queued task. For example, an increment of 10 is set for the aging increment. In some embodiments, 602 includes receiving a definition of a rule or logic that assigns to at least certain tasks an aging increment that is based at least in part on a property or data value of an attribute of the task. In 604, a definition is received of the aging interval for a queued task. For example, every 8 hours a task is incremented by the aging increment. In some embodiments, 604 includes receiving a definition of a rule or logic that assigns to at least certain tasks an aging interval that is based at least in part on a property or data value of an attribute of the task. In some embodiments, the aging increment and interval are configured based on which queue the task is in (in the event that cross queue comparisons are made). In various embodiments, the process steps of FIG. 6 can be done in any order, simultaneously, or any combination of ordered and simultaneously executed steps.

Figure 7:
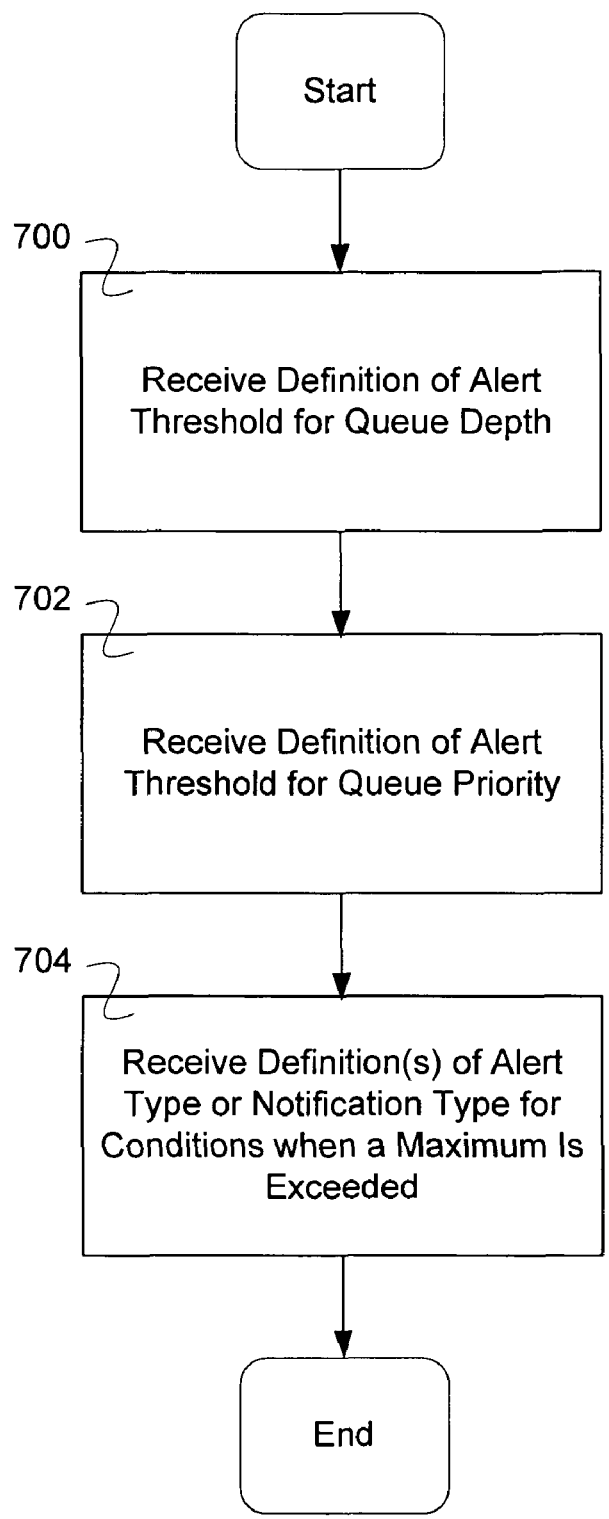
FIG. 7 is a flow diagram illustrating an embodiment of a process for receiving a definition of queue configurations.

FIG. 7 is a flow diagram illustrating an embodiment of a process for receiving a definition of queue configurations. In some embodiments, the process in FIG. 7 is used to implement 502 in FIG. 5. In the example shown, in 700 a definition is received of the alert threshold for queue depth of queued tasks in a queue. An example of an alert threshold for queue depth of tasks is 1000. If the alert threshold is exceeded, then the supervisor is informed. In various embodiments, the alert threshold is the same or is different for different queues. In 702, a definition is received of the alert threshold for queue priority for a queued task in a queue. An example of an alert threshold for queue priority is 500. In various embodiments, the alert threshold for queue priority is the same or is different for different queues. In 704, a definition is received of the alert type or notification type for the conditions when a alert threshold for a queue has been exceeded. In various embodiments, the supervisor is informed via email, by audibly indicating on the supervisor system, by entering an entry in a log file, by presenting a notification on a supervisor graphical user interface, or by any other appropriate notification or alert mechanism.

Figure 8:
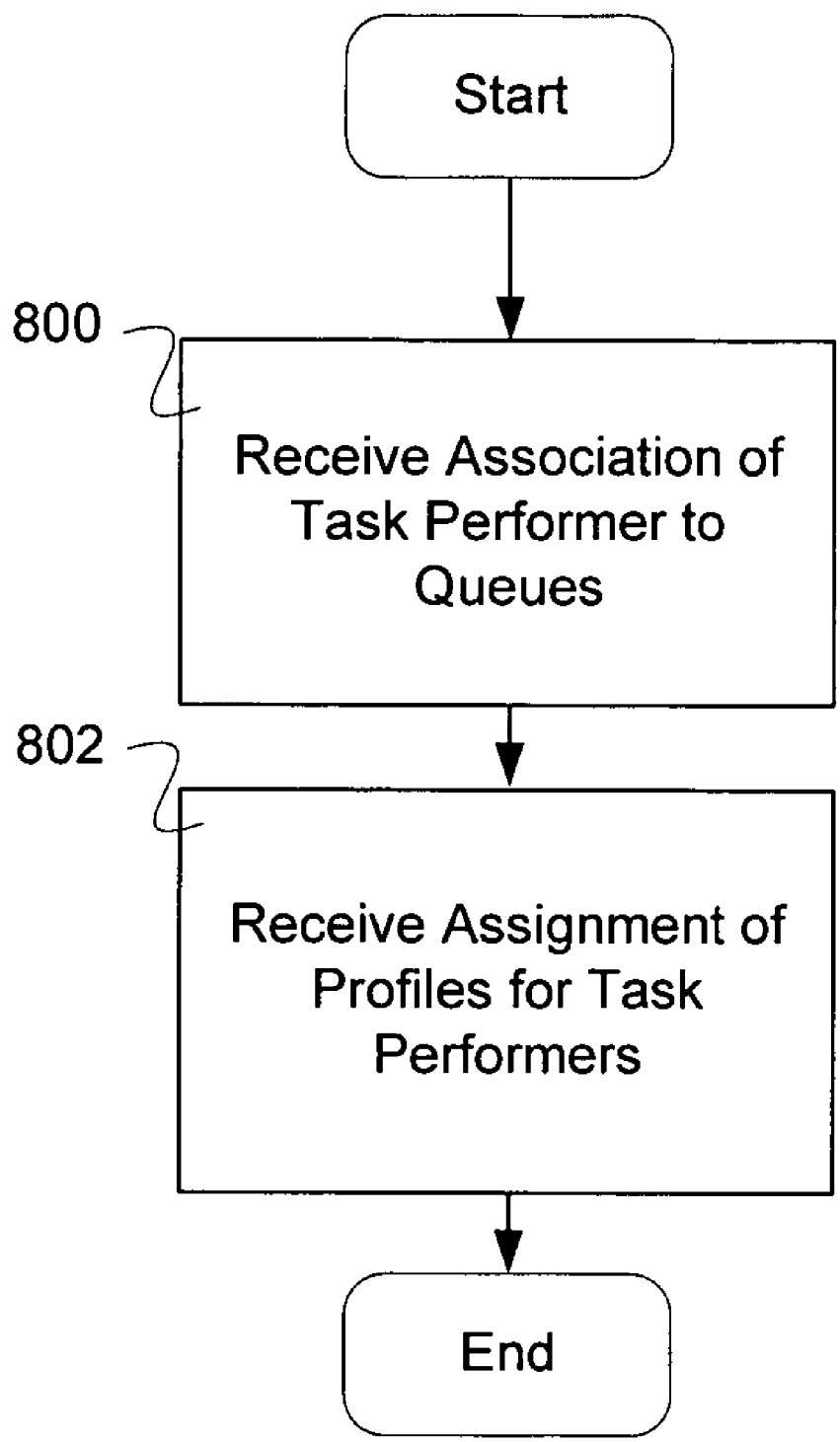
FIG. 8 is a flow diagram illustrating an embodiment of a process for receiving a definition of task performer assignments and profiles.

FIG. 8 is a flow diagram illustrating an embodiment of a process for receiving a definition of task performer assignments and profiles. In some embodiments, the process in FIG. 8 is used to implement 504 in FIG. 5. In the example shown, in 800 an assignment is received of task performers for a queue. For example, task performer A is assigned to queue 1, 3, and 5; task performer A can therefore process tasks from queues 1, 3, and 5. In some embodiments, the task that task performer A can process in a given queue depend on the task properties and the skill level, experience level, expertise capability of the task performer, and/or any other appropriate criteria, as indicated in some embodiments by associating with each task performer a profile indicating the task performer's experience, training, skill level, etc. In 802, an assignment is received of profiles for task performers. An example of a profile is one indicating that an associated task performer is a trainee who is only to be assigned tasks that are of low dollar value and/or require only basic skills or knowledge. An example of a profile is one for an advanced task performer who is able to process tasks that are of any value, that require advanced skills, etc. Other examples of profiles include ones based on geography (e.g., each task performer is assigned only tasks associated with his or her geographic region), subject matter expertise, and level of supervision required. In some embodiments, the profiles received at 802 may affect business processes and/or workflow, such as by ensuring that tasks performed by a trainee receive required review and/or spot checking, e.g., by a supervisor. In various embodiments, the process steps of FIG. 7 can be done in any order, simultaneously, or any combination of ordered and simultaneously executed steps.

Figure 9:
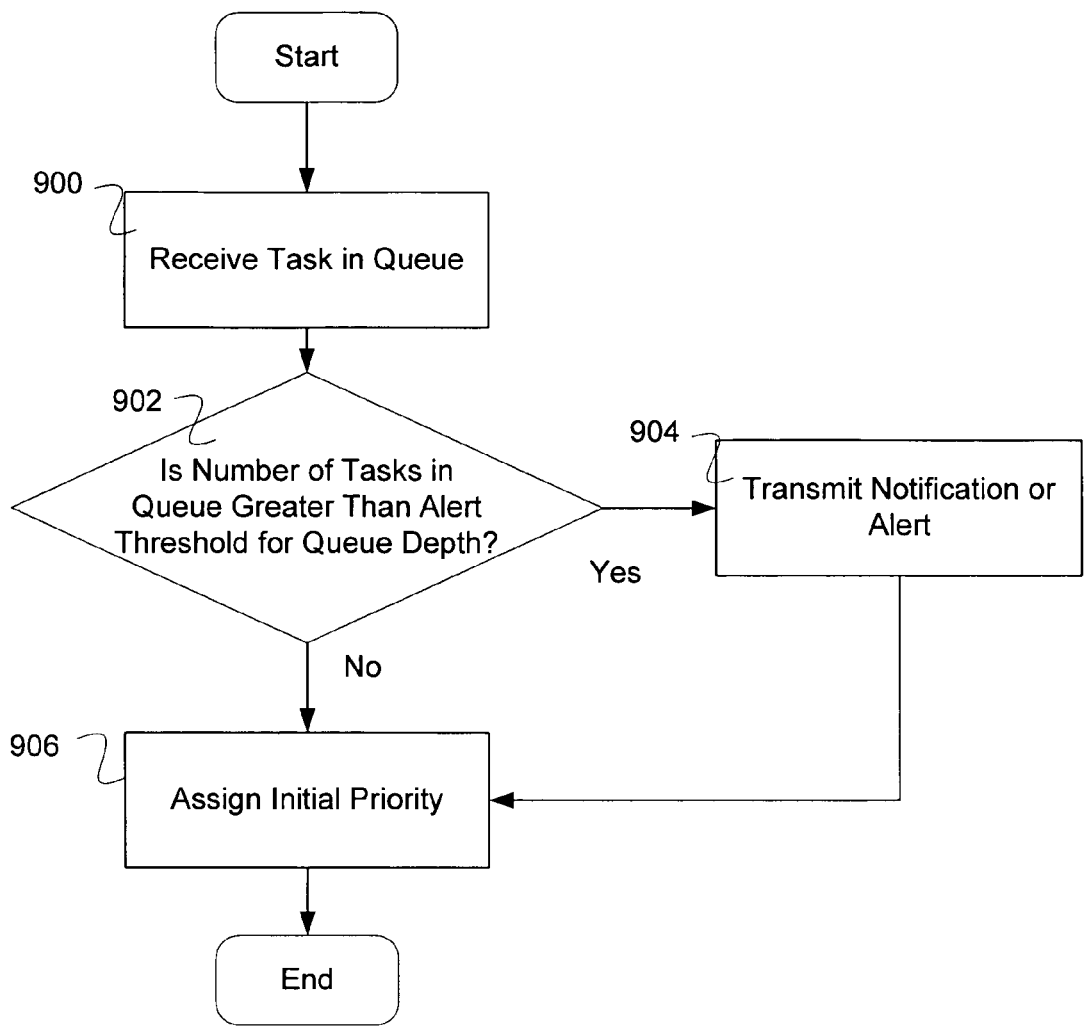
FIG. 9 is a flow diagram illustrating an embodiment of a process for adding a task to a queue.

FIG. 9 is a flow diagram illustrating an embodiment of a process for adding a task to a queue. In the example shown, in 900 a task is received for a queue. In 902 it is determined if the alert threshold for queue depth of tasks for the queue is exceeded. If the alert threshold is exceeded, then in 904 a notification or alert is transmitted and control is passed to 906. In this case, the supervisor or administrator can assign more task performers to the queue in order to process tasks so that alert threshold for queue depth threshold is not reached. In various embodiments, a notification or alert is sent to a supervisor, a senior task performer, a system administrator, or any other appropriate person or log. If the alert threshold is not exceeded, or once an alert has been sent at 904, then in 906 an initial priority is assigned to the task. For example, the initial priority is set to 100. In some embodiments, the initial priority varies based on properties of the task and/or properties of the queue.

Figure 10:
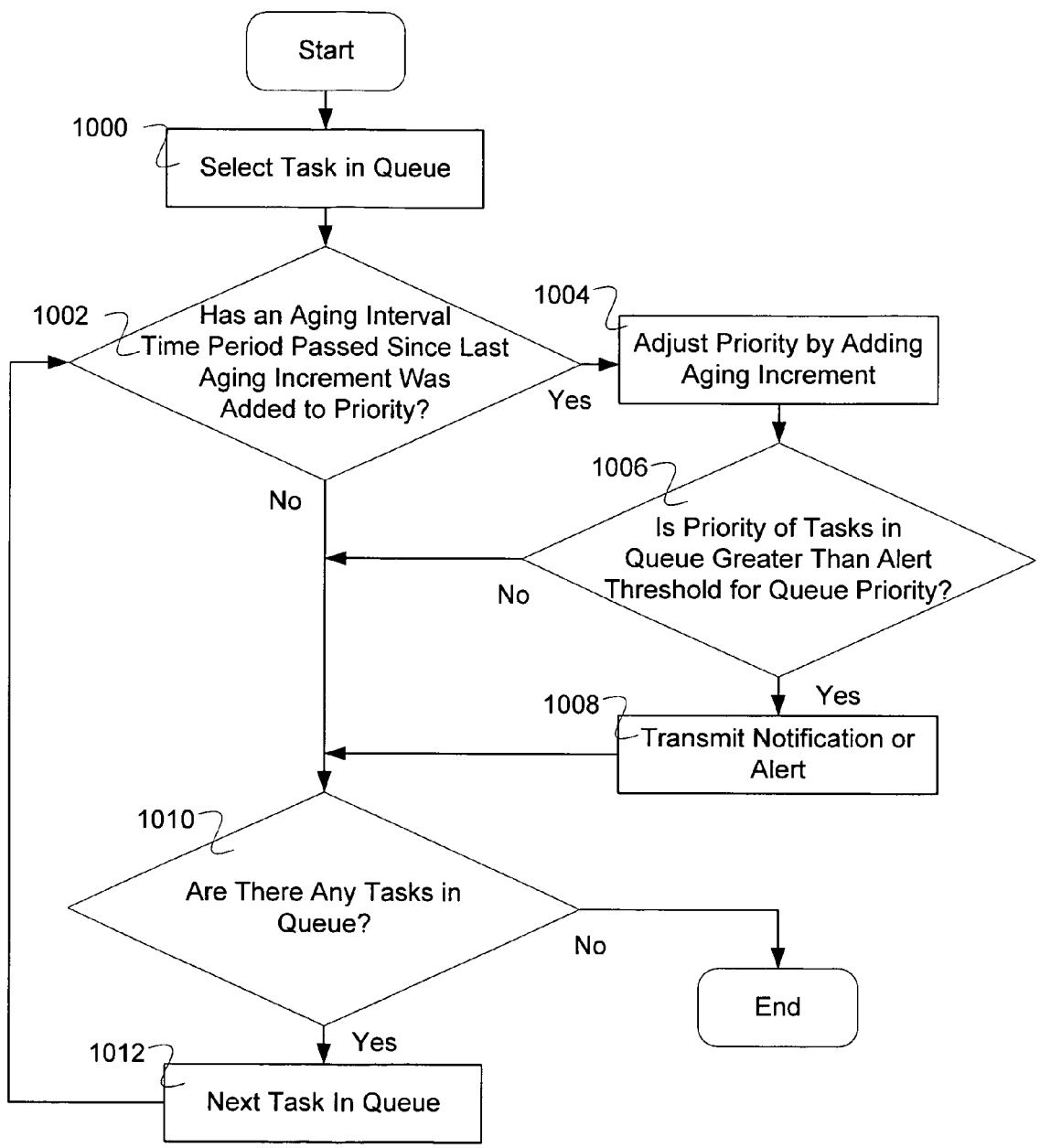
FIG. 10 is a flow diagram illustrating an embodiment of a process for aging priority in a queue.

FIG. 10 is a flow diagram illustrating an embodiment of a process for aging priority in a queue. In the example shown, in 1000 the aging process starts with a first task in the queue. In 1002 it is determined if an aging interval time period has passed since the priority of the task currently being considered (e.g., the first task in the first iteration of 1002) was last incremented or initially assigned. If the applicable aging interval time period has not passed, then control passes to 1010. If an aging interval time period has passed, then in 1004, the priority is incremented by the aging increment. For example, if the aging interval time period is 8 hours and it has passed since the last time the priority was incremented on the task, then the priority is incremented by the aging increment (e.g. 30). In some embodiments, aging occurs only on business days. In 1006, it is determined if the alert threshold for queue priority for a task in the queue is exceeded. If the alert threshold for queue priority is exceeded, then in 1008 a notification or alert is transmitted and control is passed to 1010. For example, the supervisor or system administrator is notified that the alert threshold for queue priority of the queue has been exceeded. In this case, the supervisor or administrator can assign more task performers to the queue in order to process tasks before their priority exceeds the alert threshold for queue priority. If the alert threshold for queue priority is not exceeded, then control passes to 1010. In 1010, it is determined if there are any more tasks in the queue. If there are any tasks, then in 1012 the next task is selected and control passes to 1002. As long as there are tasks in the queue, the process ages them so that the priorities of the tasks rise over time. If there are no more tasks in the queue, then the process ends.

Figure 11:
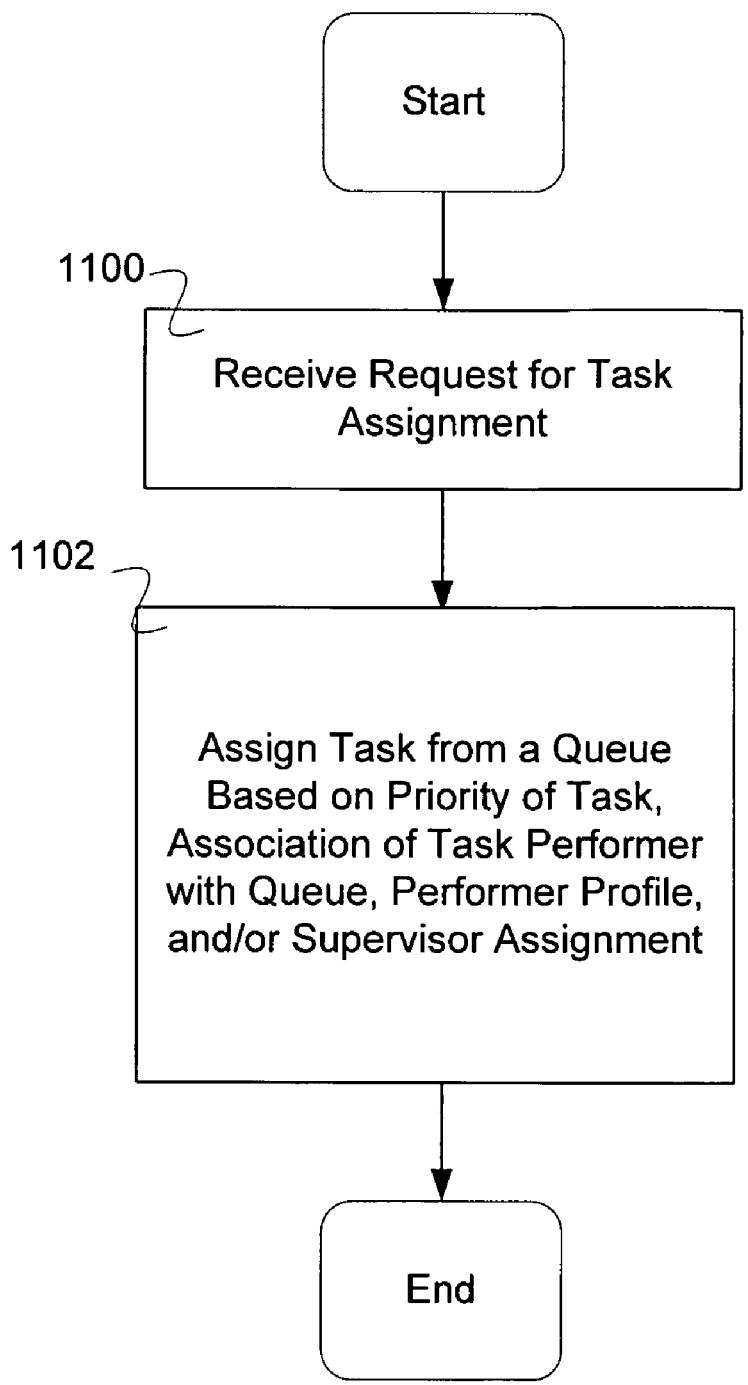
FIG. 11 is a flow diagram illustrating an embodiment of a process for assigning a task based on a profile.

FIG. 11 is a flow diagram illustrating an embodiment of a process for assigning a task based on a profile. In some embodiments, the process of FIG. 11 is used to implement the pulling off of a task from a queue as described for FIG. 4. In the example shown, in 1100 a request is received for a task to be assigned. In 1102, a task is assigned from a queue based on the priority of the task, association of the task performer with the queue, task performer profile, and/or supervisor assignment. For example, in some embodiments at 1102 the task performer with which the request received at 1100 is associated is assigned the highest priority task that matches the task performer's profile, across all of the queues with which the task performer is associated. In the event of a tie, in some embodiments the highest priority task requiring the highest skill level or with the oldest date associated with it. In various embodiments, a task is assigned to a task performer based at least in part on the task performer profile which might include experience level (e.g., novice, junior, senior, master, etc.), skill level (e.g., advanced, intermediate, trainee, etc.), regionally qualified (e.g., Northeast, West, California, Louisiana, New Orleans, US, etc.), qualified to handle a value level (e.g., greater than $10,000 amount associated with the task, etc.), qualification to handle a customer type (e.g., platinum, gold, lead, etc.), qualification to handle a type of time priority (e.g. due within a day, within a week, etc.), qualified to handle tasks requiring special knowledge (e.g. floods, hurricanes, earthquakes, equity loans, car loans, primary mortgages, credit lines, lease lending, etc.), or any other appropriate qualification or skill set. In some embodiments, 1102 includes comparing the value of one or more attributes of a task with a corresponding value or set of values included in and/or associated with the task performer's profile. In some embodiments, the task performer is offered a plurality of tasks that can be processed next and the task performer is asked to choose from among the tasks offered; the tasks offered to the task performer are tasks that the performer can perform based on his/her profile, the priority of the task, the queues the task performer has been assigned to, and in special case, tasks that a supervisor assigns to a tasks performer.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for providing a subset of tasks from a plurality of queues comprising:
   incrementing a priority for each task in the plurality of queues based on an aging increment and an aging interval, wherein the aging increment and aging interval is based at least in part on a property or data value of an attribute of the task;
   determining whether the priority of each task in the plurality of queues is greater than an alert threshold, wherein if the priority of a task is greater than the alert threshold, transmitting a notification or alert;
   receiving at a processor a request for an assignment of a task from the plurality of queues to a task performer, wherein the plurality of queues is assigned to the task performer such that the task performer is permitted to complete one or more tasks from the assigned plurality of queues; and
   in response to receiving the request, determining, using a processor, a subset of tasks from the plurality of queues based at least in part on a profile of the task performer and the priority associated with each task in the plurality of queues, wherein the profile is used at least in part to determine tasks that the task performer is allowed to perform, wherein the subset of tasks comprises a highest priority task across the plurality of queues that the task performer is determined to be allowed to perform based on the profile of the task performer;
   providing the subset of tasks to the task performer;
   receiving from the task performer a selection of the task from the subset of tasks; and
   assigning the task to the task performer, wherein the task performer is assigned to complete the task.

2. A method as in claim 1, wherein the profile includes a skill set.

3. A method as in claim 1, wherein the profile includes a skill level.

4. A method as in claim 1, wherein the profile includes an experience level.

5. A method as in claim 1, wherein the profile includes a qualification to handle a value level.

6. A method as in claim 1, wherein the profile includes a qualification to handle a geographic area.

7. A method as in claim 1, wherein the profile includes a qualification to handle a customer type.

8. A method as in claim 1, wherein the profile includes a qualification to handle a type of time priority.

9. A method as in claim 1, wherein the profile includes a qualification to handle tasks requiring special knowledge.

10. A method as in claim 1, further comprising receiving a definition indicating assignment of the plurality of task queues to the task performer.

11. A method as in claim 1, wherein the priority associated with each task from the plurality of queues is based at least in part on an initial priority value determined based at least in part on a data value of a first attribute associated with the task.

12. A computer program product for providing a subset of tasks from a plurality of queues, the computer program product being embodied in a computer readable non-transitory storage medium and comprising computer instructions for:
   incrementing a priority for each task in the plurality of queues based on an aging increment and an aging interval, wherein the aging increment and aging interval is based at least in part on a property or data value of an attribute of the task;
   determining whether the priority of each task in the plurality of queues is greater than an alert threshold, wherein if the priority of a task is greater than the alert threshold, transmitting a notification or alert;
   receiving at a processor a request for an assignment of a task from the plurality of queues to a task performer, wherein the plurality of queues is assigned to the task performer such that the task performer is permitted to complete one or more tasks from the assigned plurality of queues; and
   in response to receiving the request, determining, using a processor, a subset of tasks from the plurality of queues based at least in part on a profile of the task performer and the priority associated with each task in the plurality of queues, wherein the profile is used at least in part to determine tasks that the task performer is allowed to perform, wherein the subset of tasks comprises a highest priority task across the plurality of queues that the task performer is determined to be allowed to perform based on the profile of the task performer;
   providing the subset of tasks to the task performer;
   receiving from the task performer a selection of the task from the subset of tasks; and
   assigning the task to the task performer, wherein the task performer is assigned to complete the task.

13. A system for providing a subset of tasks from a plurality of queues comprising:
   a processor; and
   a memory coupled with the processor, wherein the memory is configured to provide the processor with instructions which when executed cause the processor to:
   increment a priority for each task in the plurality of queues based on an aging increment and an aging interval, wherein the aging increment and aging interval is based at least in part on a property or data value of an attribute of the task;
   determine whether the priority of each task in the plurality of queues is greater than an alert threshold, wherein if the priority of a task is greater than the alert threshold, transmitting a notification or alert;
   receive a request for an assignment of a task from a plurality of queues to a task performer, wherein the plurality of queues is assigned to the task performer such that the task performer is permitted to complete one or more tasks from the assigned plurality of queues; and
   in response to receiving the request, determine, using a processor, a subset of tasks from the plurality of queues based at least in part on a profile of the task performer and the priority associated with each task in the plurality of queues, wherein the profile is used at least in part to determine tasks that the task performer is allowed to perform, wherein the subset of tasks comprises a highest priority task across the plurality of queues that the task performer is determined to be allowed to perform based on the profile of the task performer;

provide the subset of tasks to the task performer;

receive from the task performer a selection of the task from the subset of tasks; and assign the task to the task performer, wherein the task performer is assigned to complete the task.

14. A system as in claim 13, wherein the profile includes a skill set.

15. A system as in claim 13, wherein the profile includes a skill level.

16. A system as in claim 13, wherein the profile includes an experience level.

17. A system as in claim 13, wherein the profile includes a qualification to handle a value level.

18. A system as in claim 13, wherein the profile includes a qualification to handle a geographic area.

19. A system as in claim 13, wherein the profile includes a qualification to handle a customer type.

20. A system as in claim 13, wherein the profile includes a qualification to handle a type of time priority.

21. A system as in claim 13, wherein the profile includes a qualification to handle tasks requiring special knowledge.

22. A system as in claim 13, wherein the processor is further configured to receive a definition indicating assignment of the plurality of task queues to the task performer.

* * * * *